(12) United States Patent
Rosén et al.

(10) Patent No.: US 12,467,636 B2
(45) Date of Patent: Nov. 11, 2025

(54) THERMAL ENERGY ASSEMBLY

(71) Applicant: E.ON SVERIGE AB, Malmo (SE)

(72) Inventors: Per Rosén, Lund (SE); Jacob Skogström, Lomma (SE); Bengt Lindoff, Bjärred (SE); Helen Carlström, Bjärred (SE); Fredrik Rosenqvist, Helsingborg (SE)

(73) Assignee: E.ON SVERIGE AB, Malmo (SE)

( * ) Notice: Subject to any disclaimer, the term of this patent is extended or adjusted under 35 U.S.C. 154(b) by 291 days.

(21) Appl. No.: 17/760,442

(22) PCT Filed: Feb. 9, 2021

(86) PCT No.: PCT/EP2021/053046
§ 371 (c)(1),
(2) Date: Aug. 9, 2022

(87) PCT Pub. No.: WO2021/160593
PCT Pub. Date: Aug. 19, 2021

(65) Prior Publication Data
US 2023/0077879 A1    Mar. 16, 2023

(30) Foreign Application Priority Data
Feb. 13, 2020    (EP) .................................. 20157142

(51) Int. Cl.
*F24D 19/10*    (2006.01)
*F24H 15/144*    (2022.01)
(Continued)

(52) U.S. Cl.
CPC ..... *F24D 19/1072* (2013.01); *F24D 19/1081* (2013.01); *F24H 15/144* (2022.01);
(Continued)

(58) Field of Classification Search
CPC .... F24D 19/1072; F24D 19/1081; F24D 3/18; F24H 15/144; F24H 15/156; F24H 15/31;
(Continued)

(56) References Cited

U.S. PATENT DOCUMENTS 6,604,376 B1 * 8/2003 Demarco ................ F25B 40/04
                                                                 62/506
9,200,811 B2 * 12/2015 Lifson ................ G05D 23/1923
(Continued)

FOREIGN PATENT DOCUMENTS

CH           671622       9/1989
CN      103148585 A       6/2013
(Continued)

OTHER PUBLICATIONS

International Search Report and Written Opinion of PCT/EP2021/053046, Dated Mar. 29, 2021 in 10 pages.

*Primary Examiner* — Marc E Norman
(74) *Attorney, Agent, or Firm* — Knobbe, Martens, Olson & Bear, LLP (57) ABSTRACT

A heat pump assembly (100) arranged to be connected to a thermal energy circuit (300) comprising a hot conduit (302) configured to allow thermal fluid of a first temperature to flow therethrough, and a cold conduit (304) configured to allow thermal fluid of a second temperature to flow therethrough, the second temperature is lower than the first temperature, and a cooling machine assembly (200) arranged to be connected to a thermal energy circuit (300) comprising a hot conduit (302) configured to allow thermal fluid of a first temperature to flow therethrough, and a cold conduit (304) configured to allow thermal fluid of a second temperature to flow therethrough.

15 Claims, 6 Drawing Sheets

(51) Int. Cl.
*F24H 15/156* (2022.01)
*F24H 15/31* (2022.01)
*F24H 15/335* (2022.01)
*F24H 15/375* (2022.01)
*F24H 15/414* (2022.01)
*F24H 15/238* (2022.01)
*F24H 15/242* (2022.01)
*F24H 15/45* (2022.01)

(52) U.S. Cl.
CPC .......... *F24H 15/156* (2022.01); *F24H 15/31* (2022.01); *F24H 15/335* (2022.01); *F24H 15/375* (2022.01); *F24H 15/414* (2022.01); *F24H 15/238* (2022.01); *F24H 15/242* (2022.01); *F24H 15/45* (2022.01)

(58) Field of Classification Search
CPC .... F24H 15/335; F24H 15/375; F24H 15/414; F24H 15/238; F24H 15/242; F24H 15/45; F24H 5/144; F24H 5/156; F24H 5/31; F24H 5/335; F24H 5/375; F24H 5/414; F24H 5/238; F24H 5/242; F24H 5/45
See application file for complete search history.

(56) References Cited

U.S. PATENT DOCUMENTS

| | | | |
|---|---|---|---|
| 11,644,199 | B2 * | 5/2023 | Rosén .................... F24D 10/00 62/324.1 |
| 11,874,014 | B2 * | 1/2024 | Rosén et al. ............. F24F 11/83 |
| 12,007,122 | B2 * | 6/2024 | Lindoff .................. F25B 13/00 |
| 2016/0344237 | A1 * | 11/2016 | Cho ........................ H02J 50/80 |

FOREIGN PATENT DOCUMENTS

| | | | | |
|---|---|---|---|---|
| CN | 103353169 | A | 10/2013 | |
| CN | 104456687 | A | 3/2015 | |
| CN | 110671841 | A | 1/2020 | |
| DE | 102017220414 | | 5/2019 | |
| DE | 102018116845 | | 1/2020 | |
| EP | 3267119 | A1 | 1/2018 | |
| EP | 3018422 | | 2/2019 | |
| EP | 3569935 | | 11/2019 | |
| JP | S52-41440 | A | 3/1977 | |
| WO | WO 2010/145040 | | 12/2010 | |
| WO | WO-2018007234 | A2 * | 1/2018 | ........... F24D 10/003 |

* cited by examiner

THERMAL ENERGY ASSEMBLY

FIELD OF THE INVENTION

The present invention relates to distribution of heating and/or cooling by means of a thermal energy circuit comprising thermal fluid from a thermal plant to thermal devices. More specifically, the present invention relates to a heat pump assembly, a cooling machine assembly and to a thermal energy assembly. It further relates to a method for controlling a heat pump assembly, a cooling machine assembly and to a thermal energy assembly.

BACKGROUND ART

Today, it is common practice in many parts of the world to provide heating and hot water for houses and buildings via an energy grid. One example of such energy grid is a district heating grid comprising a system of conduits and valves for distributing hot water to the houses and buildings such that the houses can be heated when needed via thermal devices, i.e. heat exchangers, connected to the district heating grid. Alternatively, according to another example, instead of using hot water for providing space heating, gas may be provided to the houses and buildings via the system. By having access to gas, typically a fossil fuel gas, the houses can be heated by using a thermal device in the form of a gas burner. In addition to space heating, the hot water or the gas may be used for preparing hot tap water.

To cool the houses and buildings, similar systems may be used. The general principle of these systems is however the opposite. Instead of providing heat by e.g. providing hot water, heat is collected in the houses and transported away from the houses. District cooling grids, that is, networks of conduits and valves connecting several real estates for cooling purposes, using water as heat carrier are however still rare. The common practice is instead to use electrical energy for running air conditioning systems, which is a disadvantage at least from an environmental perspective.

Even if it is known how to add and control thermal devices, e.g. heat exchanges or heat pumps, to distribution systems once new buildings are built, these can be further improved. For instance, the heating and cooling demands from the buildings are dynamic which may cause problems if the thermal devices are not able to efficiently provide heating or cooling as desired. In the case of heat pumps/cooling machines this means that more electric power is needed to meet the heating/cooling demands. This is of course not desirable, as it not only causes unnecessary environmental effects but also in that is costlier for the end costumer.

Prior art systems for providing heating by means of heating/cooling grids lack dynamic adaptation which permits the thermal devices to operate efficiently over a large span of heating/cooling loads and this is something that manufacturers of such systems continuously strive to improve.

SUMMARY OF THE INVENTION

In view of that stated above, the object of the present invention is to provide a solution to at least some of the problems stated above and to improve on prior art heating/cooling systems.

According to a first aspect, a heat pump assembly is provided which is arranged to be connected to a thermal energy circuit. The thermal energy circuit comprising a hot conduit configured to allow thermal fluid of a first temperature to flow therethrough, and a cold conduit configured to allow thermal fluid of a second temperature to flow therethrough, the second temperature is lower than the first temperature. The heat pump assembly comprises a thermal heating circuit comprising a thermal heating circuit inlet connectable to the hot conduit and a thermal heating circuit outlet connectable to the cold conduit. The thermal heating circuit is configured to transfer thermal fluid from the thermal heating circuit inlet to the thermal heating circuit outlet, the thermal heating circuit further comprising a thermal heating circuit flow controller configured to control the flow of the thermal fluid from the thermal heating circuit inlet to the thermal circuit outlet. The heat pump assembly further comprising a heat pump and a heat pump circuit comprising a heat pump circuit inlet connected to the thermal heating circuit at a first connection point, a heat pump circuit outlet connected to the thermal heating circuit at a second connection point and a heat pump control pump configured to control a flow of thermal fluid from the heat pump circuit inlet through the heat pump at an heat extraction side thereof to the heat pump circuit outlet. The heat pump assembly further comprising a heat pump assembly controller configured to control the heat pump assembly based on a parameter associated with an efficiency of the heat pump assembly, wherein the heat pump circuit and the thermal heating circuit partially overlap, wherein the overlap is between the first and second connection points.

The heat pump circuit with the heat pump control pump provides adaptability for providing the appropriate flow of thermal fluid to the heat pump. The thermal fluid in the heat pump circuit may be circulated at a flow rate which corresponds to that of the thermal heating circuit, or with a slower flow rate or with a higher flow rate. The temperature of the thermal fluid can in that way also be controlled, as the heat pump cools the thermal fluid in each passage through the heat extraction side thereof and if the heat pump circuit recirculates some of the cooled thermal fluid from the heat pump circuit outlet to the heat pump circuit inlet again it will result in a lowering of the temperature of the thermal fluid which the heat pump is exerted to. Naturally, the opposite may be achieved by lowering the flow rate in the heat pump circuit. By also taking into account the efficiency at which the heat pump assembly operates in the control of the heat pump assembly, it may more appropriately be adapted to changes in thermal demands placed on the heat pump assembly. For instance, if there are low thermal loads placed on the heat pump for a period of time, the flow rate of thermal fluid can be reduced correspondingly.

The parameter associated with an efficiency of the heat pump assembly may comprise a signal indicative of an electric power consumption by the heat pump assembly, wherein the heat pump assembly controller is configured to control the heat pump control pump based on the parameter. The electric power consumption provides an accurate measure of how the heat pump assembly is performing. Especially in an iterative process where the most beneficial flow rate of thermal fluid by the heat pump control pump is found by monitoring how changes thereto affects the electric power consumption.

The parameter associated with an efficiency of the heat pump assembly may further comprise a signal indicative of an electric power consumption by the heat pump assembly, wherein the heat pump assembly controller is configured to control the thermal circuit flow controller based on the parameter. Even further improved adaptation of the heat pump assembly to various thermal loads can thus be achieved.

The parameter associated with an efficiency of the heat pump assembly may further still comprise the electric power consumptions of the heat pump and the heat pump control pump, allowing adaptation of the heat pump circuit as a whole to achieve an improved efficiency of the heat pump. For instance, a certain flow rate increase could achieve a reduced electric power consumption by the heat pump but an increase in the electric power consumption by the heat pump control pump which is higher than the decrease in the heat pump. The heat pump assembly controller can thus take this into account and thus avoid such situations, whereby the overall electric power consumption can be reduced and the efficiency for a given thermal load of the heat pump assembly can be improved.

In a second aspect is a cooling machine assembly provided which is arranged to be connected to a thermal energy circuit. The thermal energy circuit comprising a hot conduit configured to allow thermal fluid of a first temperature to flow therethrough, and a cold conduit configured to allow thermal fluid of a second temperature to flow therethrough, the second temperature is lower than the first temperature. The cooling machine assembly comprises a thermal cooling circuit comprising a thermal cooling circuit inlet connectable to the cold conduit and a thermal cooling circuit outlet connectable to the hot conduit, the thermal cooling circuit is configured to transfer thermal fluid from the thermal cooling circuit inlet to the thermal cooling circuit outlet, the thermal cooling circuit further comprising a thermal cooling circuit flow rate controller configured to control the flow rate of the thermal fluid from the thermal cooling circuit inlet to the thermal cooling circuit outlet. The cooling machine assembly further comprises a cooling machine and a cooling machine circuit comprising a cooling machine circuit inlet connected to the thermal cooling circuit at a first connection point, a cooling machine circuit outlet connected to the thermal cooling circuit at a second connection point and a cooling machine control pump configured to control a flow of thermal fluid from the cooling machine circuit inlet through the cooling machine at an heat generation side thereof to the cooling machine circuit outlet. The cooling machine assembly comprising a cooling machine assembly controller configured to control the cooling machine assembly based on a parameter associated with an efficiency of the cooling machine assembly. The cooling machine circuit and the thermal cooling circuit partially overlap, wherein the overlap is between the first and second connection points.

The cooling machine circuit with the cooling machine control pump provides adaptability for providing the appropriate flow of thermal fluid to the cooling machine. The thermal fluid in the cooling machine circuit may be circulated at a flow rate which corresponds to that of the thermal cooling circuit, or with a slower flow rate or with a higher flow rate. The temperature of the thermal fluid can in that way also be controlled, as the cooling machine heats the thermal fluid in each passage through the heat extraction side thereof and if the cooling machine circuit recirculates some of the heated thermal fluid from the cooling machine circuit outlet to the cooling machine circuit inlet again it will result in a raising of the temperature of the thermal fluid which the cooling machine is exerted to. Naturally, the opposite may be achieved by lowering the flow rate in the cooling machine circuit. By also taking into account the efficiency at which the cooling machine assembly operates in the control of the cooling machine assembly, it may more appropriately be adapted to changes in thermal demands placed on the cooling machine assembly. For instance, if there are low thermal loads placed on the cooling machine for a period of time, the flow rate of thermal fluid can be reduced correspondingly.

The parameter associated with an efficiency of the cooling machine assembly may comprise a signal indicative of an electric power consumption by the cooling machine assembly, wherein the cooling machine assembly controller is configured to control the cooling machine control pump based on the parameter. The electric power consumption provides an accurate measure of how the cooling machine assembly is performing. Especially in an iterative process where the most beneficial flow rate of thermal fluid by the cooling machine control pump is found by monitoring how changes thereto affects the electric power consumption.

The parameter associated with an efficiency of the cooling machine assembly may comprise a signal indicative of an electric power consumption by the cooling machine assembly, wherein the cooling machine assembly controller is configured to control the thermal cooling circuit flow controller based on the parameter. Even further improved adaptation of the heat pump assembly to various thermal loads can thus be achieved.

The parameter associated with an efficiency of the cooling machine assembly may further still comprise the electric power consumptions of the cooling machine and the cooling machine control pump, allowing adaptation of the cooling machine circuit as a whole to achieve an improved efficiency thereof. For instance, a certain flow rate increase could achieve a reduced electric power consumption by the cooling machine but an increase in the electric power consumption by the cooling machine control pump which is higher than the decrease in the cooling machine. The cooling machine assembly controller can thus take this into account and thus avoid such situations, whereby the overall electric power consumption can be reduced and the efficiency for given thermal load of the cooling machine assembly can be improved.

In a third aspect is a thermal energy assembly provided. The thermal energy assembly comprising at least one heat pump assembly according to the first aspect and at least one cooling machine assembly according to the second aspect. A thermal energy assembly is thus provided in which each heat pump assembly and/or cooling machine assembly can be more accurately controlled in response to dynamic and varying loads. The thermal energy assembly as a whole consequently becomes more energy efficient as each heat pump assembly and/or cooling machine assembly can on its own control the flow rate of thermal fluid in order to lower the electric power consumption of the components thereof, which when summarized over the entire thermal energy assembly improves electric power consumption, gives a higher flexibility and facilitates overall control of the thermal energy assembly.

Furthermore, the thermal heating circuit outlet may be connected to the thermal cooling circuit inlet, and the thermal cooling circuit outlet may be connected to the thermal heating circuit inlet. The thermal fluid can thus be circulated between the heat pump assembly and the cooling machine assembly, which takes advantage of the opposite heating/cooling effect that the respective assemblies have on the thermal fluid. The thermal energy assembly can thus reduce the need to draw heated/cooled thermal fluid from the thermal energy circuit and even, under certain circumstances, become self-sustainable.

The heat pump assembly controller together with the cooling machine assembly controller may be configured to control the thermal energy assembly based on a parameter associated with an efficiency of the thermal energy assembly.

The parameter associated with an efficiency of the thermal energy assembly may comprise a signal indicative of an electric power consumption by the thermal energy assembly, the heat pump assembly controller together with the cooling machine assembly controller are configured to control the heat pump control pump and the cooling machine control pump based on the parameter.

In a fourth aspect is a method for controlling the heat pump assembly according to the first aspect provided. The method comprises:
- determining a parameter associated with an efficiency of the heat pump assembly,
- adjusting, by controlling the heat pump control pump, a flow in the heat pump circuit,
- determining the parameter associated with the efficiency of the heat pump assembly post adjustment,
- determining a change in the efficiency of the heat pump assembly based on the parameter determined pre and post adjustment, and
- adjusting, by controlling the heat pump control pump, the flow in the heat pump circuit based on the determined change. The heat pump assembly is thus provided with a flow of thermal fluid that achieves an improved electric efficiency and thus a reduction in electric power consumption for a given thermal load.

In a fifth aspect of the present disclosure, a method for controlling a cooling machine assembly according to the second aspect is provided. The method comprises:
- determining a parameter associated with an efficiency of the cooling machine assembly,
- adjusting, by controlling the cooling machine control pump, a flow in the cooling machine circuit,
- determining the parameter associated with the efficiency of the cooling machine assembly post adjustment,
- determining a change in the efficiency of the cooling machine assembly based on the parameter determined pre and post adjustment, and
- adjusting, by controlling the cooling machine control pump, the flow in the cooling machine circuit based on the determined change. The cooling machine assembly is thus provided with a flow of thermal fluid that achieves an improved electric efficiency and thus a reduction in electric power consumption for a given thermal load.

In a sixth aspect is a method for controlling a thermal energy assembly according to the third aspect provided. The method comprises:
- determining a parameter associated with an efficiency of the heat pump assembly and/or a parameter associated with an efficiency of the cooling machine assembly,
- adjusting, by controlling the heat pump control pump of the heat pump assembly and/or by controlling the cooling machine control pump of the cooling machine assembly, a flow in the heat pump circuit and/or a flow in the cooling machine circuit,
- determining the parameter associated with the efficiency of the heat pump assembly post adjustment and/or the parameter associated with the efficiency of the cooling machine assembly post adjustment,
- determining a change in the efficiency of the heat pump assembly based on the parameter determined pre and post adjustment and/or a change in the efficiency of the cooling machine assembly based on the parameter determined pre and post adjustment, and
- adjusting, by controlling the heat pump control pump of the heat pump assembly and/or the cooling machine control pump of the cooling machine assembly, the flow in the heat pump circuit and/or in cooling machine circuit based on the respective determined change. An improved thermal energy assembly is thus provided, which may reduce the electric power consumption by controlling the heat pump assembly and/or the cooling machine assembly control pump to achieve a more ideal thermal fluid flow rate for a given thermal load.

According to a seventh aspect, a non-transitory computer-readable storage medium is provided having stored thereon instructions for implementing the method for controlling a heat pump assembly according to the fourth aspect and/or the method for controlling a cooling machine assembly according to the fifth aspect and/or the method for controlling a thermal energy assembly according to the sixth aspect, when executed on a device having processing capabilities.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figures 1, 2:
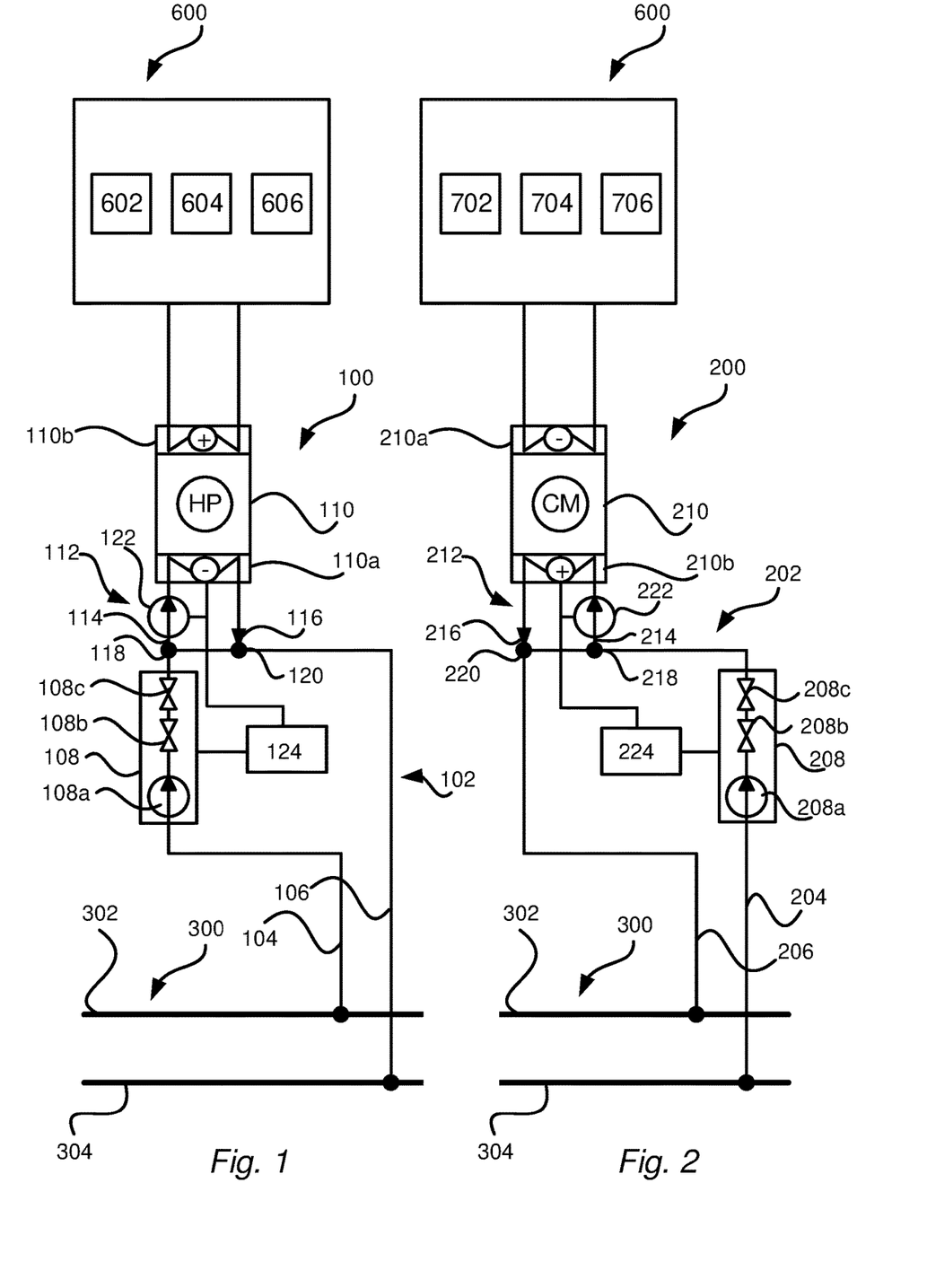
FIG. 1 schematically illustrates a heat pump assembly.
FIG. 2 schematically illustrates a cooling machine assembly.

FIG. 1 schematically illustrates a heat pump assembly 100 for distributing heat from a thermal energy circuit 300, preferably to a building 600. The building 600 may be any type of building suitable for connection to the thermal energy circuit 300, such as a residential building, commercial or office building, an apartment building, a free-standing house or an industrial building. The thermal energy circuit 300 may be a district heating grid or a district cooling grid known in the art. The district heating grid (or a district cooling grid) may comprise a supply conduit providing heating (or cooling) medium from a thermal plant (not shown) and a return conduit which transport cooled heating medium (or heated cooling medium) to the thermal plant. The heating (or cooling) medium may be any fluid suitable for heating (or cooling) at the thermal plant and transported by means of the supply conduit and the return conduit, such as water. The heating (or cooling) medium will henceforth be referred to as "thermal fluid". The thermal plant may be a geothermal plant, an electrically powered plant for heating (or cooling) fluids, or may be driven by combustion of fuels, such as gas or oil. The thermal plant is configured to heat (or cool) the heating (or cooling) medium and pump it through the thermal energy circuit 300. For a district heating grid, the supply conduit is considered as a hot conduit 302 and the return conduit is considered as a cold conduit 304. For a district cooling grid, the supply conduit is considered as a cold conduit 304 and the return conduit is considered as a hot conduit 302.

As an alternative to being a district heating or district cooling grid, the thermal energy circuit 300 may be a combined district heating and cooling grid as previously disclosed in, e.g., WO 2017/076868 filed by E.ON Sverige AB. In such case, the hot and cold conduits 302 and 304 are not to be seen as supply and return conduits but instead to be seen as the hot conduit and the cold conduit 304 as disclosed in WO 2017/076868.

Hence, the thermal energy circuit 300 comprises a hot conduit 302 and a cold conduit 304 for distributing thermal energy to/between thermal devices 100, 200, 400 connected to the distribution grid.

The thermal devices 100, 200, 400 are configured to extract heat from the thermal fluid of thermal energy circuit 300 and/or deposit heat in the thermal fluid of the thermal energy circuit 300. Hence, each of the thermal devices 100, 200, 400 is configured to distribute heating and/or cooling inside a building 600. Each of the thermal devices 100, 200, 400 can serve one building 600 or a plurality of buildings 600. A specific building may comprise one thermal device 100, 200, 400. A specific building may comprise more than one thermal device 100, 200, 400.

Each thermal device 100, 200, 400 may be embodied as a heat pump assembly 100, which extracts heat from the thermal fluid of the thermal energy circuit 300, a cooling machine 200 (shown in FIG. 2), which generates heat to the thermal energy circuit 300 or a thermal energy assembly 400 (shown in FIG. 3) comprising at least one heat pump assembly 100 and at least one cooling machine 200 respectively.

As is further shown, each building may comprise several thermal loads 602, 604, 606. For instance, a heat pump assembly 100 may be configured to provide heat for comfort heating. This can be achieved in a number of ways, for instance via water-water heating, water-air heating etc. Moreover, the heat pump assembly 100 may be configured to provide tap hot water via a for the purpose provided heat exchanger. The cooling machine 200 may be configured to provide comfort cooling, to provide cooling to office equipment such as server rooms etc. and/or for cooling of water just to name a few examples.

Each of these thermal loads 602, 604, 606, 702, 704, 706 may change dynamically which naturally affects the thermal devices 100, 200, 400. For instance, the thermal output required to maintain a certain preferred indoor temperature of the building 600 may rapidly change with changes in weather. Regardless of the conditions under which the thermal device 100, 200, 400 needs to operate, it is desired that the heat pump assembly 100 and the cooling machine 200 respectively operates as efficiently as possible.

The heat pump assembly 100 shown in FIG. 1 comprises a thermal heating circuit 102. The thermal heating circuit 102 is connected to the thermal energy circuit 300 via a thermal heating circuit inlet 104 connected to the hot conduit 302 and by a thermal heating outlet 106 connected to the cold conduit 304. The thermal heating circuit inlet 104 draws thermal fluid from the hot conduit 302 and the thermal heating circuit outlet 106 returns thermal fluid to the cold conduit 304.

For establishing and controlling the flow of thermal fluid through the thermal heating circuit 102 is a thermal heating circuit flow controller 108 provided. The thermal heating circuit flow controller 108 preferably comprises a thermal heating circuit circulation pump 108a and it may further comprise a first and optionally a second thermal heating circuit control valve 108b, 108c. The thermal heating circuit flow controller 108 may be controlled to achieve a flow of thermal fluid in the thermal heating circuit 102 in response to a parameter indicating an efficiency of the heat pump assembly 100, preferably indicative of an electric power consumption thereof. It may also be controlled to achieve a desired flow for achieving a desired temperature and/or temperature drop of the thermal fluid between the heating circuit inlet 104 and the heating circuit outlet 106 of the thermal heating circuit 102. It may also be controlled to achieve a flow of thermal fluid to/from the thermal energy circuit 300 in order to maintain a desired temperature difference between the hot conduit 302 and the cold conduit 304.

What is further shown in FIG. 1 is that the heat pump assembly 100 comprises a heat pump 110. The heat pump is configured to extract heat from the thermal fluid distributed from the thermal energy circuit 300 by the thermal heating circuit 102. Heat pumps are well known by a person skilled in the art and it will thus not be described in further detail herein. While only one heat pump 110 is shown in FIG. 1, it is to be understood that several heat pumps 110 may be connected to each thermal heating circuit 102.

The heat pump 110 may comprise a heat extraction side 110a and a heat releasing side 110b. The heat extraction side 110a is connected to a heat pump circuit 112. The heat pump circuit 112 is in turn connected to the thermal heating circuit 102 via a heat pump circuit inlet 114 at a first connection point 118 and via a heat pump circuit outlet 116 at a second connection point 120. The heat pump circuit 112 and the thermal heating circuit 102 partially overlap, such that the overlap is between the first 118 and second 120 connection points. The first and second connection points 118, 120 may be separated on the thermal heating circuit 102 by a distance corresponding to at least five diameters of the thermal heating circuit 102. The separation of the first and second connection points 118, 120 facilitates control of recirculation in the heat pump circuit 112 while reducing the risk of unintentional recirculation.

The heat pump circuit 112 further comprises a heat pump control pump 122 configured to control the flow rate of thermal fluid from the heat pump circuit inlet 114 through the heat pump 110 heat extraction side 110a. The heat pump control pump 122 allows specific control of the flow of thermal fluid through the heat pump 110. Thermal fluid can thus be circulated independently at a higher flow rate or at a lower flow rate than in the thermal heating circuit 102, allowing adaptation of the thermal fluid flow rate in the heat pump circuit 112 to the operating conditions of the heat pump 110.

Adjusting the flow through the heat pump 110 affects the amount of thermal energy that can be extracted thereby. A lowered flow of the thermal fluid through the heat pump 110 will, for a given heat extraction, cause a larger temperature drop between the heat pump circuit inlet 114 and the heat pump circuit outlet 116 than what a higher flow of thermal fluid would generate. It is commonly preferred to have a low temperature drop for the thermal fluid over the heat pump 110 as this allows an even heat extraction over the entire heat extraction side 110a. However, the flow and temperature differences preferred may change depending on the operating conditions of the heat pump 110, determined by the thermal loads 602, 604, 606 placed thereon.

Generally, it is desired to achieve as high a coefficient of performance (COP) as possible for the heat pump assembly 100/cooling machine assembly 200. I.e. the relationship between heat produced/heat removed and energy consumed by the heat pump assembly 100/cooling machine assembly 200 should be as high as possible. The COP of the heat pump assembly 100 or of the cooling machine assembly 200 is not only affected by the performance of the heat pump 110/cooling machine 200 itself but also by the performance required by all other energy consuming devices of the assembly 100, 200. For instance, the heat pump control pump 122 and the thermal heating circuit controller 108 requires power in order to achieve the required flow and thus affects the overall COP of the heat pump assembly 100.

It is thus desired to be able to control the flow of thermal fluid not only in the thermal heating circuit 102 but to the heat pump 110 specifically through the heat pump circuit 112. It is also desired that this control is performed in response to the efficiency, preferably the electric power consumption, of the heat pump assembly 100.

A more direct control of the provision of thermal fluid to the heat pump 110 in response to the efficiency thereof gives improved correspondence to what the heat pump 110 needs to achieve an improved COP for each given thermal load situation. The COP is also dependent on the temperature difference of an internal refrigerant within the heat pump 110 and it is desired to maintain as low a temperature difference as possible between the heat extraction side 110a and the heat releasing side 110b as this requires less power for achieving flow of the refrigerant in the heat pump 110, which is also taken into account with the solution provided herein.

A heat pump assembly controller 124 is provided to control the heat pump assembly 100 for achieving improved efficiency. The controller 124 may comprise a control unit 500, which will be further described in reference to FIG. 4 below.

The heat pump assembly controller 124 is configured to control the heat pump assembly 100 based on a parameter associated with an efficiency of the heat pump assembly 100. The parameter could in one embodiment comprise a signal indicative of an electric power consumption by the heat pump assembly 100 and whereby the heat pump assembly controller 124 is configured to control the heat pump control pump 122 based on the parameter. The heat pump control pump 122 will thus be controlled in order to reduce the electric power consumption by the heat pump 110 and/or by the thermal heating circuit controller 108 and/or by the heat pump control pump 122 in order to reduce the electric power consumption while the heat pump 110 meets the thermal loads 602, 604, 606. For instance, if the one thermal load increases this affects the operation of the heat pump 110, and may change the conditions under which the condensor/evaporator thereof operates the most efficiently. If the heat pump 110 is confined to operation under circumstances which are suboptimal, the heat pump 110 will consume more electric power in order to meet the thermal loads 602, 604 606. This is detected by the heat pump assembly control 124 which controls the heat pump control pump 122 and/or the thermal heating circuit flow rate controller 108 in order to find an alternate flow rate of thermal fluid that reduces the electric power consumption of the heat pump assembly 100.

Also the temperatures of the hot conduit 302 and the cold conduit 304 may be subject to dynamic change and this will also affect the performance of the heat pump assembly 100, which may be compensated for by the provision of heat pump circuit 112 and the heat pump assembly controller 124 which can control the components of the heat pump assembly 100 to achieve a new flow rate of thermal fluid in which the heat pump 110 works more efficiently and thus lower the power consumption of the assembly 100.

In one embodiment, the heat pump assembly controller 124 is configured to control the thermal circuit flow controller 108 based on the parameter, which may comprise a signal indicative of a power consumption by the heat pump assembly 100.

In one embodiment, the parameter may comprise a signal indicative of the electric power consumptions of the heat pump 110 and the heat pump control pump 122 alone.

Turning now to FIG. 2, which schematically illustrates a cooling machine assembly 200 for distributing heat to a thermal energy circuit 300 from a building 600. As many features are shared with the embodiments described in relation to FIG. 1, reference is made to the description of FIG. 1 for some of the common features in FIG. 2.

Each building may comprise several thermal loads 702, 704, 706. The cooling machine assembly 200 may be configured to provide comfort cooling, to provide cooling to office equipment such as server rooms etc and/or for cooling of water just to name a few examples.

The cooling machine assembly 200 shown in FIG. 2 comprises a thermal cooling circuit 202. The thermal cooling circuit 202 is connected to the thermal energy circuit 300 via a thermal cooling circuit inlet 204 connected to the cold conduit 304 and by a thermal cooling outlet 206 connected to the hot conduit 304. The thermal cooling circuit inlet 204 draws thermal fluid from the cold conduit 304 and the thermal cooling circuit outlet 206 returns thermal fluid to the hot conduit 304.

For establishing and controlling the flow of thermal fluid through the thermal cooling circuit 202 is a thermal cooling circuit flow controller 208 provided. The thermal cooling circuit flow controller 208 preferably comprises a thermal cooling circuit circulation pump 208a and it may further comprise a first and optionally a second thermal cooling circuit control valve 208b, 208c.

The thermal cooling circuit flow controller 208 may be controlled to achieve a flow of thermal fluid in the thermal cooling circuit 202 in response to a parameter indicating an efficiency of the cooling machine assembly 200, preferably indicative of an electric power consumption thereof. It may also be controlled to achieve a desired flow for achieving a desired temperature and/or temperature drop of the thermal fluid between the cooling circuit inlet 204 and the cooling circuit outlet 206 of the thermal cooling circuit 202. It may also be controlled to achieve a rate of thermal fluid to/from the thermal energy circuit 300 in order to maintain a desired temperature difference between the hot conduit 302 and the cold conduit 304.

What is further shown in FIG. 2 is that the cooling machine assembly 200 comprises a cooling machine 210. The cooling machine is configured to release heat into the thermal fluid distributed from the thermal energy circuit 300 by the thermal cooling circuit 202. Cooling machines 210 are well known by a person skilled in the art and it will thus not be described in further detail herein. While only one cooling machine 210 is shown in FIG. 2, it is to be understood that several cooling machines 210 may be connected to each thermal cooling circuit 202.

The cooling machine 210 may comprise a heat extraction side 210a and a heat releasing side 210b. The heat releasing side 210b is connected to a cooling machine circuit 212. The cooling machine circuit 212 is in turn connected to the thermal cooling circuit 202 via a cooling machine circuit inlet 214 at a first connection point 218 and via a cooling machine circuit outlet 216 at a second connection point 220. The cooling machine circuit 212 and the thermal cooling circuit 202 partially overlap, such that the overlap is between the first 218 and second 220 connection points. The first and second connection points 218, 220 may be separated on the thermal heating circuit 202 by a distance corresponding to at least five diameters of the thermal heating circuit 202. The separation of the first and second connection points 218, 220 facilitates control of recirculation in the cooling machine circuit 212 while reducing the risk of unintentional recirculation. The cooling machine circuit 212 further comprises a cooling machine control pump 222 configured to control the flow rate of thermal fluid from the cooling machine circuit inlet 214 through the cooling machine 210 heat releasing side 210a. The cooling machine control pump 222 allows specific control of the flow of thermal fluid through the cooling machine 210. Thermal fluid can thus be circulated independently at a higher flow rate or at a lower flow rate than in the thermal cooling circuit 202, allowing adaptation of the thermal fluid flow rate in the cooling machine circuit 212 to the operating conditions of the cooling machine 210.

Adjusting the flow of the thermal fluid through the cooling machine 210 affects the amount of thermal energy that can be released thereby. A lowered flow of the thermal fluid through the cooling machine 210 will, for a given heat release in the heat releasing side 210b of the cooling machine 210, cause a larger temperature rise between the cooling machine circuit inlet 214 and the cooling machine circuit outlet 216 than what a higher flow of thermal fluid would generate. It is commonly preferred to have a low temperature rise of the thermal fluid over the cooling machine 210 as this allows an even heat release over the entire heat releasing side 210b. However, the flow and temperature differences preferred may change depending on the operating conditions of the cooling machine 210, determined by the thermal loads 602, 604, 606 placed thereon.

It is desired to be able to control the flow of thermal fluid not only in the thermal cooling circuit 202 but to the cooling machine 210 specifically through the cooling machine circuit 212. It is also desired that this control is performed in response to the efficiency, preferably the electric power consumption, of the cooling machine assembly 200.

A more direct control of the provision of thermal fluid to the cooling machine 210 in response to the efficiency thereof gives improved correspondence to what the cooling machine 210 needs to achieve an improved COP for each given thermal load situation. The COP is also dependent on the temperature difference of an internal refrigerant within the heat pump 210 and it is desired to maintain as low a temperature difference as possible between the heat extraction side 210a and the heat releasing side 210b as this requires less power for achieving flow of the refrigerant in the cooling machine 210, which is also taken into account with the solution provided herein.

A cooling machine assembly controller 224 is provided to control the cooling machine assembly 200 for achieving improved efficiency. The controller 224 may comprise a control unit 500, which will be further described in reference to FIG. 5 below.

The cooling machine assembly controller 224 is configured to control the cooling machine assembly 200 based on a parameter associated with an efficiency of the cooling machine assembly 200. The parameter could in one embodiment comprise a signal indicative of a power consumption by the cooling machine assembly 200 and whereby the cooling machine assembly controller 224 is configured to control the cooling machine control pump 222 based on the parameter. The cooling machine control pump 222 will thus be controlled in order to reduce the energy/power consumption by the cooling machine 210 and/or by the thermal cooling circuit controller 208 and/or by the cooling machine control pump 222 in order to reduce the electric power consumption while the cooling machine 210 meets the thermal loads 702, 704, 706. For instance, if the one thermal load increases this affects the operation of the cooling machine 210, and may change the conditions under which the condensor/evaporator thereof operates the most efficiently. If the cooling machine 210 is confined to operation under circumstances which are suboptimal, the cooling machine 210 will consume more power in order to meet the thermal loads 602, 604 606. This is detected by the cooling machine assembly control 224 which controls the cooling machine control pump 222 and/or the thermal cooling circuit flow rate controller 208 in order to find an alternate flow rate of thermal fluid that reduces the electric power consumption of the cooling machine assembly 200.

Also the temperatures of the hot conduit 302 and the cold conduit 304 may be subject to dynamic change and this will also affect the performance of the cooling machine assembly 200, which may be compensated for by the provision of cooling machine circuit 212 and the cooling machine assembly controller 224 which can control the components of the cooling machine assembly 200 to achieve a new flow rate of thermal fluid in which the cooling machine 210 works more efficiently and thus lower the power consumption of the assembly 200.

In one embodiment, the cooling machine assembly controller 224 is configured to control the thermal circuit flow rate controller 208 based on the parameter, which may comprise a signal indicative of a power consumption by the heat pump assembly 200.

In one embodiment, the parameter may comprise a signal indicative of the energy consumptions of the cooling machine 210 and the cooling machine control pump 222 alone.

Figure 3:
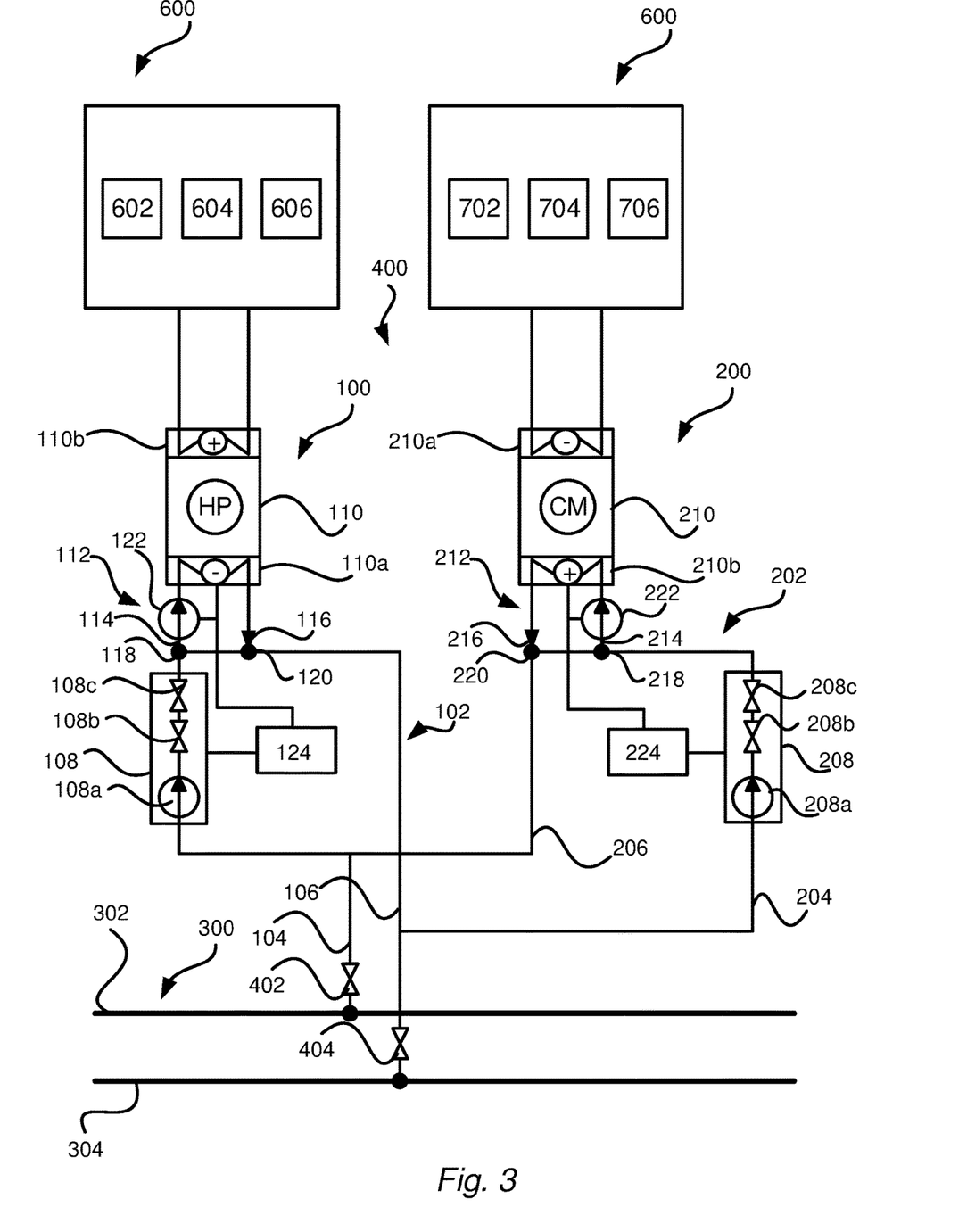
FIG. 3 schematically illustrates a thermal energy assembly.

In FIG. 3, a thermal energy assembly 400 is schematically illustrated. The thermal energy assembly 400 show in FIG. 4 comprises a heat pump assembly 100 and a cooling machine assembly 200. However, it is to be realized that the thermal energy assembly 400 could comprise more than one heat pump assembly 100 and/or more than one cooling machine assembly 200.

The thermal assembly 400 shows the heat pump assembly 100 and the cooling machine assembly 200 respectively being connected to the thermal energy circuit 300. In the embodiment shown in FIG. 3, the heat pump assembly 100 and the cooling machine assembly 200 are connected to each other. The heat pump assembly outlet 106 is connected to the cooling machine assembly inlet 204 and the heat pump assembly inlet 104 is connected to the cooling machine assembly outlet 206. This allows distribution of thermal fluid between the heat pump assembly 100 and the cooling machine assembly 200, which is beneficial as it reduces the thermal requirements on the thermal energy circuit 300. Under certain circumstances may the thermal energy assembly 400 be self-sufficient, as the heated thermal fluid from the cooling machine assembly 200 already has the desired temperature and flow rate for the heat pump assembly 100.

The thermal assembly 400 may further be provided with a first thermal assembly valve 402 and a second thermal assembly valve 404. The first thermal assembly valve 402 is configured to control the flow of thermal fluid to/from the hot conduit 304 and the second thermal assembly valve 404 is configured to control the flow of thermal fluid to/from the cold conduit 304. The first and second thermal assembly valve 402, 404 can thus control how much thermal fluid that can be consumed/returned to the thermal energy circuit 300 which is useful under circumstances where some or complete redistribution of the thermal fluid is desired between the heat pump assembly 100 and the cooling machine assembly 200

As is further shown, the heat pump assembly 100 and the cooling machine assembly 200 each comprises a heat pump assembly controller/cooling machine assembly controller 124, 224. While the respective controller 124, 224 is illustrated separately in FIG. 3, it is to be realized that the controllers 124, 224 may just as well be formed from a single controller which comprises the required functionality to control both the heat pump assembly 100 and the cooling machine assembly 200.

The first and second thermal assembly valve 402, 404 may thus be controlled by the heat pump assembly controller 124 and/or by the thermal cooling machine controller 224.

The heat pump assembly controller 124 together with the cooling machine assembly controller 224 are configured to control the thermal energy assembly 400 based on a parameter associated with an efficiency of the thermal energy assembly 400. As mentioned, the parameter preferably comprises the electric power consumption by the heat pump assembly 100 and by the cooling machine assembly 200, such as to reduce the power consumption by improving the circumstances under which the heat pump assembly 100 and the cooling machine assembly 200 operates. Specifically, in one embodiment, the parameter may comprise the power consumption of the heat pump 110/cooling machine 210 and the heat pump control pump 122/cooling machine control pump 222.

Figure 4:
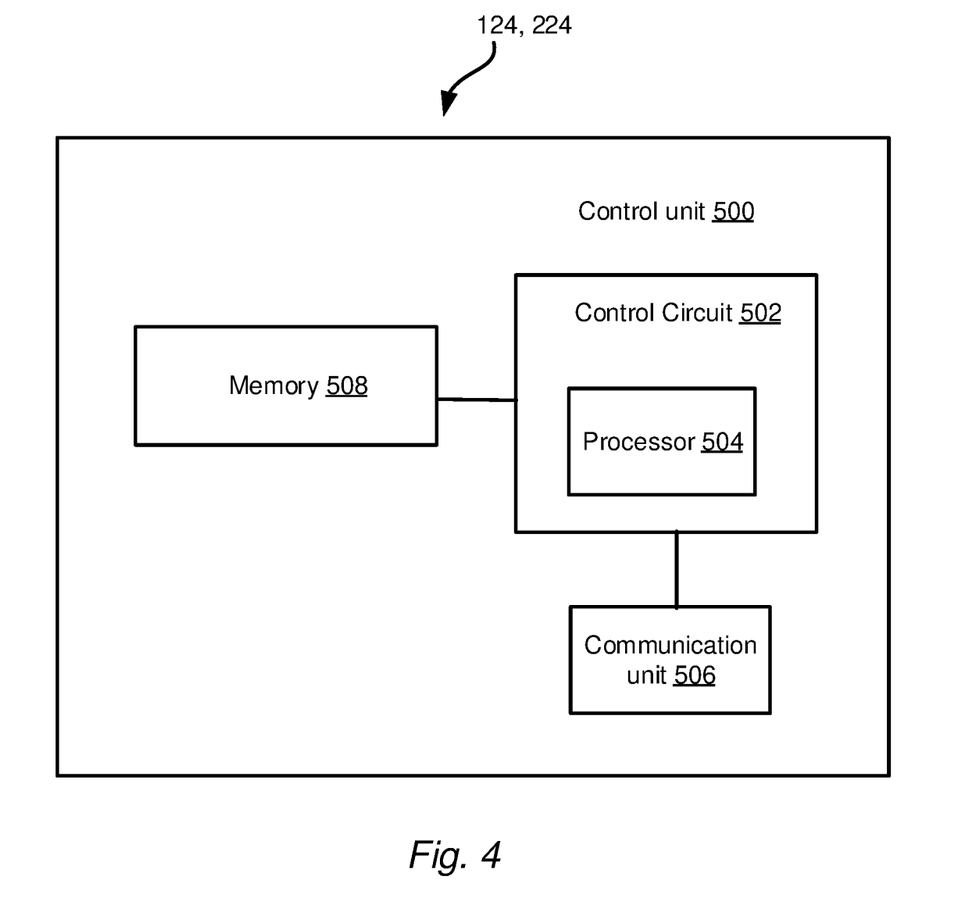
FIG. 4 schematically illustrates a heat pump/cooling machine assembly controller.

Turning to FIG. 4 in which a schematic illustration of the heat pump assembly controller 124/thermal cooling machine controller 224 is shown. The respective controller 124, 224, which may be formed by a single unit as mentioned, is configured to carry out overall control of functions and operations of the heat pump assembly 100, of the cooling machine assembly 200 and of the thermal energy assembly 400 respectively, and thus comprises a control unit 500 which may be associated with a memory 508. The control unit 500 may include a control circuit 502 and an associated processor 504, such as a central processing unit (CPU), microcontroller, or microprocessor. The processor 504 is configured to execute program code stored in the memory 508, in order to carry out functions and operations of the controller 124, 224.

The memory 508 may be one or more of a buffer, a flash memory, a hard drive, a removable media, a volatile memory, a non-volatile memory, a random access memory (RAM), or another suitable device. In a typical arrangement, the memory 508 may include a non-volatile memory for long term data storage and a volatile memory that functions as system memory for the control unit 500. The memory 508 may exchange data with the control unit 500 over a data bus. Accompanying control lines and an address bus between the memory 508 and the control unit 500 also may be present.

The control unit 500 may further comprise a communication unit 506, connected to the control circuit 502, configured to allow remote control of units of the respective assembly (heat pump assembly 100, cooling machine assembly 200 and/or thermal energy assembly 400). A unit of an assembly, may be a pump, a valve heat pump a cooling machine, a flow controller, etc. The communication path over which the communication is made may be wired or wireless. The communication may include data transfers, and the like. Data transfers may include, but are not limited to, downloading and/or uploading data and receiving or sending messages. The data may be processed by the control unit 500. The processing may include storing the data in a memory, e.g. the memory 508 of the control unit 500, executing operations or functions, and so forth. The communication may be individual for each units of the respective assembly.

Functions and operations of the control unit 500 may be embodied in the form of executable logic routines (e.g., lines of code, software programs, etc.) that are stored on a non-transitory computer readable medium (e.g., the memory 508) of the control unit 500 and are executed by the control circuit 502 (e.g., using the processor 504). Furthermore, the functions and operations of the control unit 500 may be a stand-alone software application or form a part of a software application that carries out additional tasks related to the control unit 500. The described functions and operations may be considered a method that the corresponding device is configured to carry out. Also, while the described functions and operations may be implemented in software, such functionality may as well be carried out via dedicated hardware or firmware, or some combination of hardware, firmware and/or software.

Figure 5:
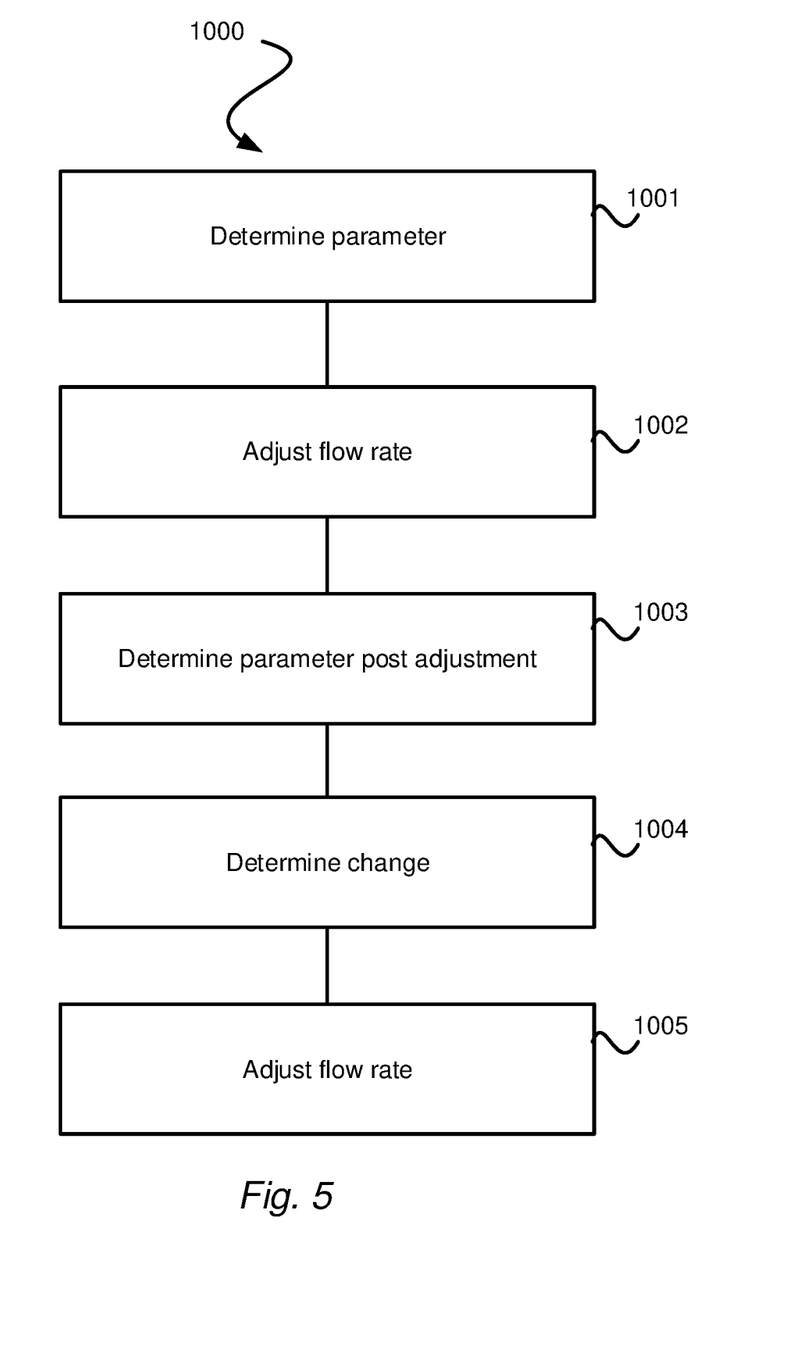
FIG. 5 illustrates a flow chart of a method for controlling a heat pump assembly.
Figure 6:
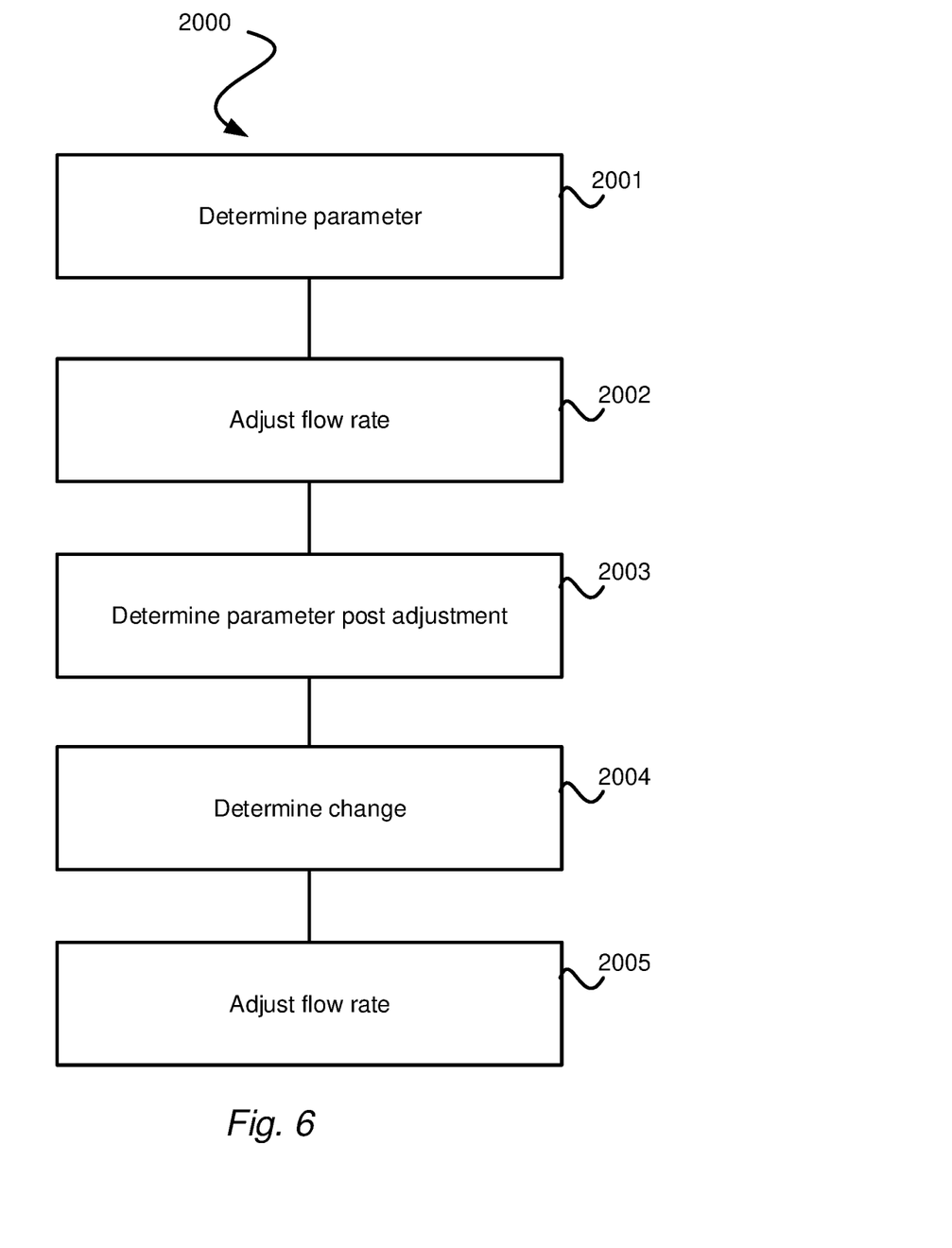
FIG. 6 illustrates a flow chart of a method for controlling a cooling machine assembly.
Figure 7:
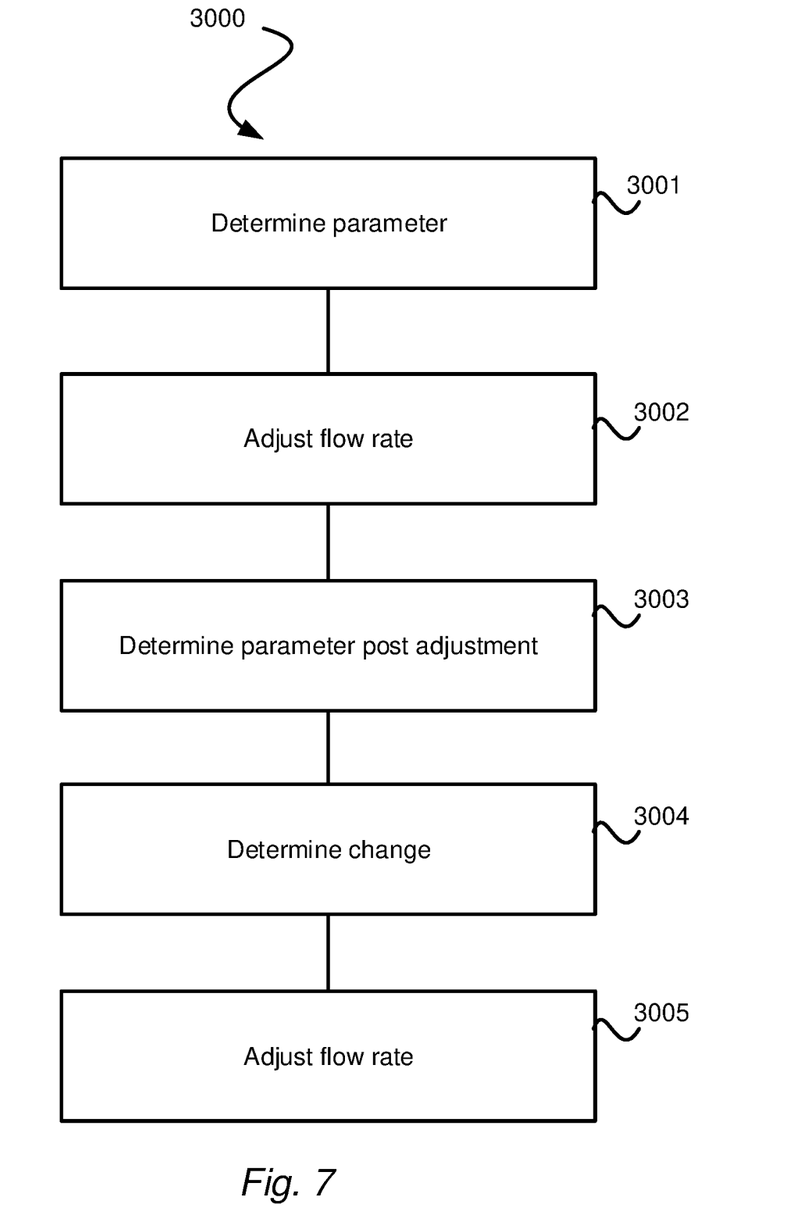
FIG. 7 illustrates a flow chart of a method for controlling a thermal energy assembly.

With simultaneous reference to FIGS. 5 to 7, a method 1000, 2000, 3000 for controlling the heat pump assembly 100, the cooling machine assembly 200 and the thermal energy assembly 400, respectively, will be described.

The method comprises determining 1001, 2001, 3001 a parameter associated with an efficiency of the heat pump assembly 100, of the cooling machine assembly 200 or of the thermal energy assembly 300, respectively. As previously mentioned, the parameter preferably comprises a signal indicating the electric power consumption of the heat pump assembly 100, the cooling machine assembly 200, or of the thermal energy assembly 400. The electric power consumption may in one embodiment be that of the heat pump control pump 122 and the heat pump 110, the cooling machine control pump 222 and the cooling machine 210 and/or of both in the thermal energy assembly 400. The parameter may further comprise a signal indicating the current thermal delivery of the heat pump 110 or of the cooling machine 210, respectively. This may be beneficial, as the control of respective control pump 122, 222 can thus be managed with respect to this. The thermal delivery of the heat pump 110 and the cooling machine 210 may be determined by monitoring a differential pressure over a compressor of the respective device 110, 210. The differential pressure can be used, with knowledge of the characteristics of the compressor for instance by use of a compressor map as is known in the art, to determine added heat in the evaporator and released heat in the condenser. This will provide a good measure of the thermal delivery of the heat pump 110/cooling machine 210, and thus provide, together with the electric power consumption thereof, an overall indicator of the efficiency of the heat pump assembly 100, of the cooling machine assembly 200 and of the thermal energy assembly 400.

The electric power consumption could be measured for instance by an electric metering device, which could form part of the controller 124, 224 and which monitors the Watt/Watthours consumed by the components of the respective assembly 100, 200, 400 as described above. Other means for measuring the electric power consumption is also possible as is realized by a person skilled in the art.

Moreover, the before/after temperatures and/or flow rates of the internal thermal fluid of the heat pump 110/210 through the condenser/evaporator could also be measured in order further improve the accuracy of the determining of the thermal delivery of the heat pump 110 and of the cooling machine 210 respectively.

Thereafter or in conjunction therewith, the heat pump control pump 122 of the heat pump assembly 100 and the cooling machine control pump 222 of the cooling machine assembly 200 is adjusted 1002, 2002, 3002 to alter a flow in the heat pump circuit 112 and the cooling machine circuit 212, respectively. In the thermal energy assembly 400, the procedure is the same for each heat pump assembly 100 and cooling machine assembly 200 respectively. However, each heat pump assembly 100 and each cooling machine assembly 200 may comprise more than one heat pump 110 and cooling machine 210, respectively. Consequently, may also each heat pump assembly 100 and each cooling machine assembly comprise more than one heat pump control pump 122 and cooling machine control pump 222 respectively, it is thus desired to adjust 1002, 2002, 3002 each control pump 122, 222. Having one control pump 122, 222 for each heat pump 110 and cooling machine 210 is preferred as this gives the control the best possible resolution. However, one control pump 122, 222 could be configured to provide thermal fluid to more than one heat pump 110/cooling machine 210.

The respective method 1000, 2000, 3000 further comprises determining 1003, 2003, 3003 the parameter associated with the efficiency of the heat pump assembly 100, of the cooling machine assembly 200, of the thermal energy assembly 400 post adjustment.

Thereafter is a change determined 1004, 2004, 3004 in the efficiency of the heat pump assembly 100, of the cooling machine assembly 200, of the thermal energy assembly 400 respectively, based on the parameter determined pre and post adjustment.

The heat pump control pump 122 and the cooling machine control pump 222 of the heat pump assembly 100, of the cooling machine assembly 200 and of the thermal energy assembly 400 is then adjusted 1005, 2005, 3005 to control the flow of thermal fluid based on the determined change.

If the power consumption change was an increase and the adjustment 1002, 2002, 3003 was an increase in the flow rate from the heat pump control pump 122/cooling machine control pump 222, the subsequent adjustment will thus be to control the respective control pump 122, 222 to achieve a decrease in the flow rate of thermal fluid.

If the increase in flow rate led to a reduced power consumption, the flow rate can be increased even more until the power consumption start to rise, in order to find a flow rate for the heat pump 110/cooling machine 210 which is as close to optimal as possible. The method 1000, 2000, 3000 will be iterated either continuously, in predetermined time intervals or on demand in order to provide each heat pump 110 and cooling machine 210 with thermal fluid at a flow rate and/or temperature that achieves a reduction in electric power consumption. As it is not only the heat pump 110 or the cooling machine 210 which consumes electrical energy in the heat pump assembly 100, in the cooling machine assembly 200 and in the thermal energy assembly 400, the parameter may comprise the electric power consumptions of the heat pump 110, the heat pump control pump 122, the cooling machine 210 and the cooling machine control pump 222.

The adjustment steps 1002, 2002, 3002, 1005, 2005, 3005 of the respective method 1000, 2000, 3000 may comprise the heat pump assembly controller 124 and the cooling machine assembly controller 224 controlling the thermal heating circuit flow rate controller 108 and the thermal cooling circuit flow rate controller 208 based on the parameter.

As there is an inherent delay and inertia in the heat pump assembly 100 and in the cooling machine assembly 200 before a power consumption change can be detected, there may be applied a time delay before the post adjustment efficiency is determined 1003, 2003, 3003 after the first adjustment 1002, 2002, 3002.

It will be appreciated that the present invention is not limited to the embodiments shown. Several modifications and variations are thus conceivable within the scope of the invention which thus is exclusively defined by the appended claims. For instance, it is to be realized that while the embodiments described above are with reference to dedicated heat pump 110 and cooling machine 210, respectively, the teachings herein could just as well be applied to a reversible heat pump device which could alternatingly function as either a heat pump or a cooling machine. In such a heat pump device the heat pump device can switch the heat extracting side and heat releasing side on request, depending on if the heat pump device is to function as a heat pump or cooling machine, respectively. Such a heat pump device is disclosed in EP 3 569 935 A1 by applicant E.ON Sverige AB.

The invention claimed is:

1. A heat pump assembly arranged to be connected to a thermal energy circuit comprising a hot conduit configured to allow thermal fluid of a first temperature to flow therethrough, and a cold conduit configured to allow thermal fluid of a second temperature to flow therethrough, the second temperature is lower than the first temperature, the heat pump assembly comprising:
a thermal heating circuit comprising a thermal heating circuit inlet connectable to the hot conduit and a thermal heating circuit outlet connectable to the cold conduit, the thermal heating circuit is configured to transfer thermal fluid from the thermal heating circuit inlet to the thermal heating circuit outlet, the thermal heating circuit further comprising a thermal heating circuit flow controller configured to control the flow of the thermal fluid from the thermal heating circuit inlet to the thermal circuit outlet;
a heat pump;
a heat pump circuit comprising a heat pump circuit inlet connected to the thermal heating circuit at a first connection point, a heat pump circuit outlet connected to the thermal heating circuit at a second connection point and a heat pump control pump configured to control a flow of thermal fluid from the heat pump circuit inlet through the heat pump at a heat extraction side thereof to the heat pump circuit outlet; and a heat pump assembly controller configured to control the heat pump assembly based on a parameter associated with an efficiency of the heat pump assembly, wherein the parameter comprises a signal indicative of electric power consumption by the heat pump assembly;

wherein the heat pump circuit and the thermal heating circuit partially overlap, wherein the overlap is between the first and second connection points, and wherein the heat pump assembly controller is configured to reduce electric power consumption of the heat pump by at least controlling, based on the signal, the heat pump assembly such that the heat pump control pump circulates thermal fluid in the heat pump circuit independently at a higher flow rate or at a lower flow rate than in the thermal heating circuit.

2. The heat pump assembly according to claim 1, wherein the parameter comprises a signal indicative of an electric power consumption by the heat pump assembly, wherein the heat pump assembly controller is configured to control the heat pump control pump based on the parameter.

3. The heat pump assembly according to claim 2, wherein the parameter comprises the electric power consumptions of the heat pump and the heat pump control pump.

4. The heat pump assembly according to claim 1, wherein the parameter comprises a signal indicative of an electric power consumption by the heat pump assembly, wherein the heat pump assembly controller is configured to control the thermal circuit flow controller based on the parameter.

5. A cooling machine assembly arranged to be connected to a thermal energy circuit comprising a hot conduit configured to allow thermal fluid of a first temperature to flow therethrough, and a cold conduit configured to allow thermal fluid of a second temperature to flow therethrough, the second temperature is lower than the first temperature, the cooling machine assembly comprising:

a thermal cooling circuit comprising a thermal cooling circuit inlet connectable to the cold conduit and a thermal cooling circuit outlet connectable to the hot conduit, the thermal cooling circuit is configured to transfer thermal fluid from the thermal cooling circuit inlet to the thermal cooling circuit outlet, the thermal cooling circuit further comprising a thermal cooling circuit flow controller configured to control the flow of the thermal fluid from the thermal cooling circuit inlet to the thermal cooling circuit outlet;

a cooling machine;

a cooling machine circuit comprising a cooling machine circuit inlet connected to the thermal cooling circuit at a first connection point, a cooling machine circuit outlet connected to the thermal cooling circuit at a second connection point and a cooling machine control pump configured to control a flow of thermal fluid from the cooling machine circuit inlet through the cooling machine at a heat generation side thereof to the cooling machine circuit outlet, and a cooling machine assembly controller configured to control the cooling machine assembly based on a parameter associated with an efficiency of the cooling machine assembly, wherein the parameter comprises a signal indicative of electric power consumption by the cooling machine assembly, wherein the cooling machine circuit and the thermal cooling circuit partially overlap, wherein the overlap is between the first and second connection points, and wherein the cooling machine assembly controller is configured to reduce electric power consumption of the cooling machine by at least controlling, based on the signal, the cooling machine assembly such that the cooling machine control pump circulates thermal fluid in the cooling machine circuit independently at a higher flow rate or at a lower flow rate than in the thermal cooling circuit.

6. The cooling machine assembly according to claim 5, wherein the parameter comprises a signal indicative of an electric power consumption by the cooling machine assembly, wherein the cooling machine assembly controller is configured to control the cooling machine control pump based on the parameter.

7. The cooling machine assembly according to claim 6, wherein the parameter comprises the electric power consumptions of the cooling machine and the cooling machine control pump.

8. The cooling machine assembly according to claim 5, wherein the parameter comprises a signal indicative of an electric power consumption by the cooling machine assembly, wherein the cooling machine assembly controller is configured to control the thermal cooling circuit flow controller based on the parameter.

9. A thermal energy assembly comprising at least one heat pump assembly according to claim 1 and at least one cooling machine assembly, wherein the cooling machine assembly is arranged to be connected to the thermal energy circuit comprising the hot conduit configured to allow thermal fluid of the first temperature to flow therethrough, and the cold conduit configured to allow thermal fluid of the second temperature to flow therethrough, the second temperature is lower than the first temperature, the cooling machine assembly comprising:

a thermal cooling circuit comprising a thermal cooling circuit inlet connectable to the cold conduit and a thermal cooling circuit outlet connectable to the hot conduit, the thermal cooling circuit is configured to transfer thermal fluid from the thermal cooling circuit inlet to the thermal cooling circuit outlet, the thermal cooling circuit further comprising a thermal cooling circuit flow controller configured to control the flow of the thermal fluid from the thermal cooling circuit inlet to the thermal cooling circuit outlet;

a cooling machine;

a cooling machine circuit comprising a cooling machine circuit inlet connected to the thermal cooling circuit at a first connection point of the cooling machine circuit, a cooling machine circuit outlet connected to the thermal cooling circuit at a second connection point of the cooling machine circuit and a cooling machine control pump configured to control a flow of thermal fluid from the cooling machine circuit inlet through the cooling machine at a heat generation side thereof to the cooling machine circuit outlet, and a cooling machine assembly controller configured to control the cooling machine assembly based on a parameter associated with an efficiency of the cooling machine assembly, wherein the cooling machine circuit and the thermal cooling circuit partially overlap, wherein the overlap is between the first and second connection points.

10. The thermal energy assembly according to claim 9, wherein the thermal heating circuit outlet is connected to the thermal cooling circuit inlet, and wherein the thermal cooling circuit outlet is connected to the thermal heating circuit inlet.

11. The thermal energy assembly according to claim 9, wherein the heat pump assembly controller together with the cooling machine assembly controller are configured to control the thermal energy assembly based on a parameter associated with an efficiency of the thermal energy assembly.

12. The thermal energy assembly according to claim 11, wherein the parameter associated with an efficiency of the thermal energy assembly comprises a signal indicative of an electric power consumption by the thermal energy assembly, wherein the heat pump assembly controller together with the cooling machine assembly controller are configured to control the heat pump control pump and the cooling machine control pump based on the parameter.

13. A method for controlling a thermal energy assembly according to claim 9, the method comprising:
- determining a parameter associated with an efficiency of the heat pump assembly and/or a parameter associated with an efficiency of the cooling machine assembly,
- adjusting, by controlling the heat pump control pump of the heat pump assembly and/or by controlling the cooling machine control pump of the cooling machine assembly, a flow in the heat pump circuit and/or a flow in the cooling machine circuit,
- determining the parameter associated with the efficiency of the heat pump assembly post adjustment and/or the parameter associated with the efficiency of the cooling machine assembly post adjustment,
- determining a change in the efficiency of the heat pump assembly based on the parameter determined pre and post adjustment and/or a change in the efficiency of the cooling machine assembly based on the parameter determined pre and post adjustment, and
- adjusting, by controlling the heat pump control pump of the heat pump assembly and/or the cooling machine control pump of the cooling machine assembly, the flow in the heat pump circuit and/or in cooling machine circuit based on the respective determined change.

14. A method for controlling a heat pump assembly, wherein the heat pump assembly is arranged to be connected to a thermal energy circuit comprising a hot conduit configured to allow thermal fluid of a first temperature to flow therethrough, and a cold conduit configured to allow thermal fluid of a second temperature to flow therethrough, the second temperature is lower than the first temperature, the heat pump assembly comprising:
- a thermal heating circuit comprising a thermal heating circuit inlet connectable to the hot conduit and a thermal heating circuit outlet connectable to the cold conduit, the thermal heating circuit is configured to transfer thermal fluid from the thermal heating circuit inlet to the thermal heating circuit outlet, the thermal heating circuit further comprising a thermal heating circuit flow controller configured to control the flow of the thermal fluid from the thermal heating circuit inlet to the thermal circuit outlet;
- a heat pump;
- a heat pump circuit comprising a heat pump circuit inlet connected to the thermal heating circuit at a first connection point, a heat pump circuit outlet connected to the thermal heating circuit at a second connection point and a heat pump control pump configured to control a flow of thermal fluid from the heat pump circuit inlet through the heat pump at a heat extraction side thereof to the heat pump circuit outlet; and
- a heat pump assembly controller configured to control the heat pump assembly based on a parameter associated with an efficiency of the heat pump assembly, wherein the parameter comprises a signal indicative of electric power consumption by the heat pump assembly;

wherein the heat pump circuit and the thermal heating circuit partially overlap, wherein the overlap is between the first and second connection points, wherein the method comprises:
- determining a first parameter value associated with the parameter,
- adjusting, by controlling the heat pump control pump, a flow in the heat pump circuit based on the first parameter value,
- determining a second parameter value associated with the parameter post adjustment,
- determining a change in the efficiency of the heat pump assembly based on the first parameter value and the second parameter value, and
- adjusting, by controlling the heat pump control pump, the flow in the heat pump circuit based on the determined change in the efficiency.

15. A method for controlling a cooling machine assembly arranged to be connected to a thermal energy circuit comprising a hot conduit configured to allow thermal fluid of a first temperature to flow therethrough, and a cold conduit configured to allow thermal fluid of a second temperature to flow therethrough, the second temperature is lower than the first temperature, the cooling machine assembly comprising:
- a thermal cooling circuit comprising a thermal cooling circuit inlet connectable to the cold conduit and a thermal cooling circuit outlet connectable to the hot conduit, the thermal cooling circuit is configured to transfer thermal fluid from the thermal cooling circuit inlet to the thermal cooling circuit outlet, the thermal cooling circuit further comprising a thermal cooling circuit flow controller configured to control the flow of the thermal fluid from the thermal cooling circuit inlet to the thermal cooling circuit outlet;
- a cooling machine;
- a cooling machine circuit comprising a cooling machine circuit inlet connected to the thermal cooling circuit at a first connection point, a cooling machine circuit outlet connected to the thermal cooling circuit at a second connection point and a cooling machine control pump configured to control a flow of thermal fluid from the cooling machine circuit inlet through the cooling machine at a heat generation side thereof to the cooling machine circuit outlet, and
- a cooling machine assembly controller configured to control the cooling machine assembly based on a parameter associated with an efficiency of the cooling machine assembly, wherein the parameter comprises a signal indicative of electric power consumption by the cooling machine assembly, wherein the cooling machine circuit and the thermal cooling circuit partially overlap, wherein the overlap is between the first and second connection points, wherein the method comprises:
- determining a first parameter value associated with the parameter,
- adjusting, by controlling the cooling machine control pump, a flow in the cooling machine circuit based on the first parameter value,
- determining a second parameter value associated with the parameter post adjustment,
- determining a change in the efficiency of the cooling machine assembly based on the first parameter value and the second parameter value, and adjusting, by controlling the cooling machine control pump, the flow in the cooling machine circuit based on the determined change in the efficiency.

* * * * *